June 3, 1952 — S. E. HELBERG — 2,598,911
FILM OR PLATE HOLDER FOR CAMERAS
Filed May 12, 1949
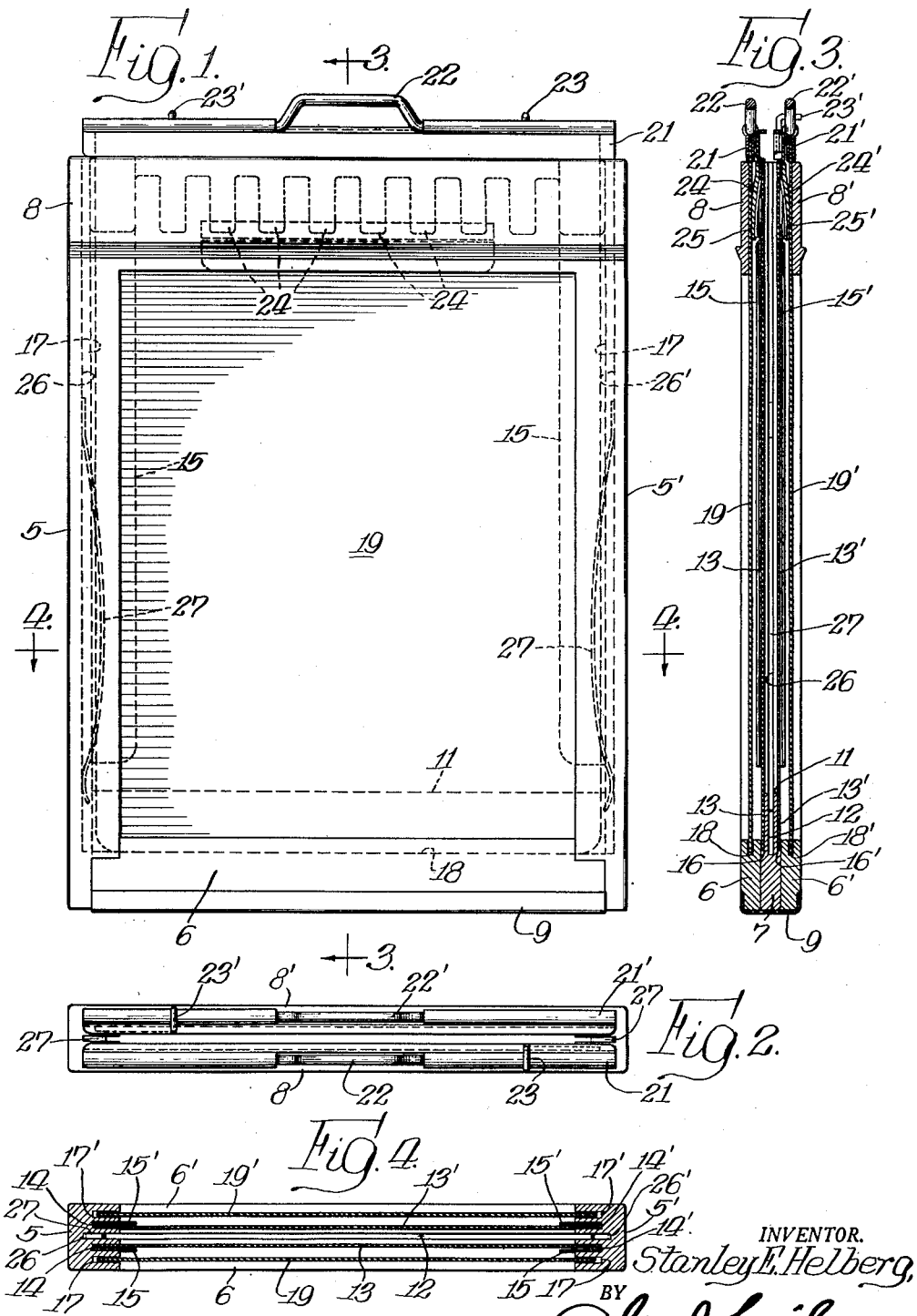
INVENTOR.
Stanley E. Helberg Patented June 3, 1952

2,598,911

UNITED STATES PATENT OFFICE 2,598,911

FILM OR PLATE HOLDER FOR CAMERAS

Stanley E. Helberg, Chicago, Ill.

Application May 12, 1949, Serial No. 92,861

1 Claim. (Cl. 95—66)

This invention relates to plate or film holders for cameras and, more particularly, to a plate or film holder embodying a construction and arrangement whereby the film or plate protective slides or sheaths may themselves be protected and saved against loss or damage when not in use for their purpose of guarding the plate or film against accidental exposure.

The primary objective of the invention is to provide a plate or film holder with means whereby the dark slide or film sheath conveniently, accessibly and safely may be positioned and temporarily stored in the film or plate holder itself during that period over which the sheath or slide is out of its normal position covering the film or plate, thereby to eliminate the common practice of laying the slide or sheath in some position or place where it may be lost or damaged. It is a common practice when a film or plate is to be exposed to withdraw the sheath or slide from the holder and either to place it in one's pocket or to lay it down in some immediately available spot with consequent chance of loss or damage, in either of which events the exposed plate or film may in turn be lost or damaged. The invention provides a convenient and easily accessible place for reception and storage of the slide or sheath so that it will be neither lost or damaged, and is always readily available for replacement in its position over the film or plate for protection of the same from the light.

Many other objects as well as the advantages and uses of the invention will be or should become fully apparent and understood after reading the following description and claim and after viewing the drawings, in which:

Fig. 1 is a front elevation view of the usual double holder for plates or films in which a preferred embodiment of the invention has been incorporated;

Fig. 2 is a top plan view of the same;

Fig. 3 is a vertical section taken along the section line 3—3 of Fig. 1; and

Fig. 4 is a transverse sectional view taken along section line 4—4 of Fig. 1.

The holder comprises vertical side frame members 5, 5', bottom frame members 6, 6' and 7, and top frame members 8, 8'. All of these frame parts may be made of any suitable material, but are frequently made of wood and are painted or coated jet black in the usual manner and for the usual purposes. The side, bottom and top frame members may be glued or otherwise securely fastened together and, after the usual practice, a fabric binding may extend around the bottom edges as indicated at 9 or may continue up both side frame members to the tops thereof.

The holder illustrated is designed to carry two cut films or two plates, one on either side, so that after exposure of one the holder may be turned about for exposure of the other. The center part 7 ordinarily extends throughout the full height and width of the holder and forms a partition or backing member against which the plate or film is disposed and held flat during the time that the picture is to be taken but in this instance, and for the purposes of the invention, terminates as indicated at 11 somewhat above the lowermost edge location of a piece of cut film or a photographic plate and is recessed or slotted through its length, i. e. transversely of either face of the holder, as indicated at 12, for a purpose to be described.

Extending throughout the length and breadth of the holder and in spaced relation to one another are a pair of backing plates or partition members 13, 13' which may be made of metal or plastic or other material. These partitions or backing plates may conveniently be held along their side edges in slots 14, 14' formed in the side frame members 5, 5' and, preferably, have their vertical edge portions bent back upon themselves as indicated at 15, 15' to form retaining guides beneath and between which and the main portions of the backing plates or partition members the cut film or the photographic plates are held. The lower edges of the backing plates or partition members 13, 13' may be retained in suitable slots 16, 16' between the bottom frame members 6 and 6' and 7, as best illustrated in Fig. 3, so that they are firmly retained in position.

Each side frame member is slotted as indicated at 17, 17' and each of bottom frame members 6, 6' is slotted as indicated at 18, 18' to provide correspondingly registering slots for reception of film sheaths or slides 19 and 19', the upper ends of which are held in metal frame strips 21, 21' and wired after the usual manner with suitable wire, which also provides finger grips 22, 22'. Attached to the upper ends of the partition members 13, 13' are swivel lock pins 23, 23' which, when swung to the positions indicated in Figs. 1, 2 and 3, serve to prevent the slides or sheaths 19, 19' from accidental removal or dropping out. Attached to the upper ends of the partition members or backing plates 13, 13' are longitudinally extending transversely spaced spring fingers 24, 24' adapted to press black velvet or other fabric or other soft light-excluding material indicated at 25, 25' against the interior surfaces of the respective slides or sheaths 19, 19'.

The construction described, including the spacing of the two partition members or backing plates 13, 13', together with vertically extending grooves 26, 26' defines a slot of sufficient dimensions, in each of the three dimensional directions, to receive either of the slides or sheaths 19, 19' when disposed therein. Thus, when the plate holder is in the camera the slide or sheath covering the film or plate which is to be exposed is withdrawn from its position where it covers the film or plate and may be slid into the slot between the partition members 13, 13' where it will be retained until after the exposure has been made. Thereafter, the sheath is removed from the center slot and reinserted in the slot from which it was originally removed, again to cover and exclude light from the adjacent film or plate. In like manner, when the holder is reversed in the camera to permit exposure of the other film or plate, the film cover slide or sheath is removed and placed in the center slot temporarily and until the film or plate has been exposed and is to be re-covered. If it is desired, thin and narrow leaf springs 27 may be secured in the side slots 26, 26' as indicated in Figs. 1 and 3 thereby frictionally to grip the side edges of the cover slide or sheath to prevent accidental displacement of the latter from the center slot.

While I have illustrated and described what is at present a preferred embodiment of the invention, it will be appreciated and understood that many variations and changes may be made therein without departing from the invention spirit or the scope of the appended claim.

I claim:

A photographic plate or film holder comprising a frame having a top, bottom and side frame members, each having laterally spaced slots to receive and retain a pair of partition members located in spaced apart relation with each partition member adapted to receive and hold a photograph plate or film, additional laterally spaced slots provided in said frame members with the slots in the top frame member open for receiving a pair of dark slides each adapted to be mounted in front of a partition member and adapted to be withdrawn to expose a plate or film, aligned auxiliary slots in the frame members in the space between the partition members for receiving a dark slide when removed from in front of a partition member to expose its plate or film, the auxiliary slot in the top frame member being open to the exterior to readily receive and guide the removed dark slide into the aligned slots of the side frame members, and a leaf spring in each of the last mentioned slots projecting into the path of the dark slide for frictionally gripping the side edges of the slide to prevent accidental displacement of the latter but permitting its ready removal and replacement in front of a partition member.

STANLEY E. HELBERG.

REFERENCES CITED

The following references are of record in the file of this patent:

UNITED STATES PATENTS

| Number | Name | Date |
|---|---|---|
| 1,229,882 | Callaway et al. | June 12, 1917 |
| 2,056,144 | Roth | Sept. 29, 1936 |

FOREIGN PATENTS

| Number | Country | Date |
|---|---|---|
| 14,753 | Great Britain | of 1892 |
| 241,219 | Switzerland | July 1, 1946 |